US010953977B2

(12) United States Patent
Panthera

(10) Patent No.: US 10,953,977 B2
(45) Date of Patent: Mar. 23, 2021

(54) AIRCRAFT WITH IN-FLIGHT FORM VARYING APPARATUS

(71) Applicant: Aidan Panthera, Vernon, CT (US)

(72) Inventor: Aidan Panthera, Vernon, CT (US)

(*) Notice: Subject to any disclaimer, the term of this patent is extended or adjusted under 35 U.S.C. 154(b) by 297 days.

(21) Appl. No.: 16/176,831

(22) Filed: Oct. 31, 2018

(65) Prior Publication Data

US 2019/0144100 A1 May 16, 2019

Related U.S. Application Data

(60) Provisional application No. 62/584,366, filed on Nov. 10, 2017.

(51) Int. Cl.
*B64C 3/56* (2006.01)
*B64C 13/34* (2006.01)
*B64C 1/00* (2006.01)

(52) U.S. Cl.
CPC .............. *B64C 3/56* (2013.01); *B64C 13/34* (2013.01); *B64C 2001/0045* (2013.01); *B64C 2201/021* (2013.01); *B64C 2201/102* (2013.01)

(58) Field of Classification Search
CPC ... B64C 3/56; B64C 13/34; B64C 2001/0045; B64C 2201/102; B64C 2201/021; F42B 10/14
See application file for complete search history.

(56) References Cited

U.S. PATENT DOCUMENTS

| | | | | |
|---|---|---|---|---|
| 2,539,489 A * | 1/1951 | Smith | ................... | B64C 37/00 244/2 |
| 2,818,744 A * | 1/1958 | Moody | ................... | B64C 13/34 74/89.37 |
| 3,625,631 A * | 12/1971 | Covington, Jr. | ........ | B64C 27/50 416/1 |
| 8,089,034 B2 * | 1/2012 | Hammerquist | ........... | B64C 3/56 244/3.28 |
| 8,393,564 B2 * | 3/2013 | Kroo | ........................ | B64C 3/56 244/6 |

(Continued)

FOREIGN PATENT DOCUMENTS

DE 10346189 B3 * 5/2005 ............... B64C 5/12

OTHER PUBLICATIONS

International Search Report and Written Opinion for PCT Application No. PCT/US2018/054882 dated Apr. 30, 2019, 10 pages.

*Primary Examiner* — Tien Q Dinh
*Assistant Examiner* — Madison Elizabeth Dittner
(74) *Attorney, Agent, or Firm* — Dinsmore & Shohl LLP; Matthew D. Epstein

(57) ABSTRACT

An aircraft operable between a deployed position and a stowed position is disclosed. The aircraft includes a fuselage, a pair of wing segments, and a translation and rotation mechanism for attaching the wing segments to the fuselage. The mechanism includes an upper assembly having an outer shaft and an inner shaft. A first wing segment is attached to the outer shaft and a second wing segment is attached to the inner shaft. The outer shaft translates downward with respect to the inner shaft. Thereafter, the outer and inner shafts rotate in opposite directions in order to rotate the wing segments on top of one another, parallel to a long axis of the fuselage, and into the stowed position. The operation of the outer and inner shafts is reversed in order to return the wing segments to the deployed position.

18 Claims, 13 Drawing Sheets

(56) References Cited

U.S. PATENT DOCUMENTS

| | | | | |
|---|---|---|---|---|
| 8,876,039 | B2* | 11/2014 | Lubenow | B64C 39/024 |
| | | | | 244/49 |
| 9,545,991 | B1* | 1/2017 | Alley | B64C 3/40 |
| 10,112,698 | B2* | 10/2018 | Barnes | B64C 3/56 |
| 2016/0347446 | A1* | 12/2016 | Vetter | B64C 27/26 |
| 2017/0369150 | A1* | 12/2017 | Finklea | B64D 17/80 |

* cited by examiner

AIRCRAFT WITH IN-FLIGHT FORM VARYING APPARATUS

CROSS-REFERENCE TO RELATED APPLICATION

This application is a non-provisional application which claims the priority benefit of U.S. Provisional Patent Application Ser. No. 62/584,366, filed Nov. 10, 2017, for "Aircraft With In-Flight Form Varying Apparatus," the entire disclosure of which, including the drawing, is hereby incorporated by reference.

TECHNICAL FIELD

The present invention pertains to aircrafts capable of vertical takeoff and landing. More particularly, the present invention concerns aircrafts having a deformable shape for improving flight in undesirable conditions. Even more particularly, the present invention pertains to assemblies for operating the wing or wings of an aircraft to facilitate varying the shape and size of the aircraft.

BACKGROUND OF THE INVENTION

The first successful airplane was originally developed by the Wright Brothers in 1903. Ever since then, new and improved structural designs are constantly developed in order to improve flight characteristics and meet consumer demands.

In general, an aircraft such as a fixed-wing airplane (as opposed to a rotorcraft, such as a helicopter) typically includes one or more horizontal wings, a fuselage, one or more propulsion devices, a vertical stabilizer, a horizontal stabilizer, and landing gear. These components can vary depending on the aircraft's desired purpose.

The fuselage or body of the aircraft is generally a long, thin structure having tapered or rounded ends in order to provide improved aerodynamics. The fuselage is the housing structure for the cockpit, passengers, and flight systems maintained within the interior of the aircraft.

Aircrafts include propulsion devices, such as propeller engines, jet engines, electric engines, rocket engines, and the like, in order to create thrust and initiate flight of the aircraft. These propulsion devices may be attached to the wings directly or coupled to the fuselage.

The vertical stabilizer, also referred to as a fin, is a vertical wing-like surface mounted at the rear of the aircraft. The vertical stabilizer controls the yaw of the aircraft in order to prevent unnecessary turning to the left and right. The horizontal stabilizer is also mounted at the rear of the aircraft. The horizontal stabilizer is used to control the pitch of the aircraft in order to prevent incidental tilting up or down at the front of the fuselage. A horizontal stabilizer, referred to as a canard, may also be disposed at the front end of the aircraft. Additionally, an empennage or tail having a T-tail structure functions as both a horizontal and a vertical stabilizer.

The wings of the aircraft deflect air downward as the aircraft moves forward, thereby generating lift. The wings generally extend from opposite sides of the fuselage or body of the aircraft and prevent the aircraft from rolling to the right or left during flight. Thus, the wing does not extend across the width of the fuselage. This prevents the wing from generating any lift across the width of the fuselage. Moreover, these styles of aircrafts provide aerodynamic boundary layers at the fuselage which interferes with the wing near the attachment location to the fuselage. This greatly reduces lift generated by the wings as well.

Despite the above-mentioned structural components of an aircraft, it can be dangerous or not possible to fly an aircraft in undesirable conditions such as in high wind and/or in smaller spaces. The large dimensions of a fixed-wing aircraft substantially adds to the width of the aircraft. Thus, there is a need for an aircraft capable of varying its shape and dimensions when necessary, while in flight, in order to accommodate these conditions.

SUMMARY OF THE INVENTION

The present invention overcomes the problems associated with known fixed-winged aircrafts by providing a deformable structure capable of varying its shape and dimensions. The present invention offers the significant general advantage of accommodating flying in smaller spaces, varying spaces, or spaces with obstacles, being able to fly in high wind or varying wind conditions, and taking up less space while stowed. For example, the aircraft may be an unmanned aerial vehicle which autonomously delivers cargo or packages in an environment having obstacles such as building structures, poles, wires, trees, etc. Alternatively, the aircraft may be a manned personal aerial vehicle which takes off and lands in close proximity to other manned aerial vehicles.

The present invention provides an aircraft operable between a deployed position and a stowed position. The aircraft includes a fuselage having a long axis, a pair of wing segments, and a translation and rotation mechanism for attaching the wing segments to the fuselage. In the deployed position, the wing segments extend perpendicular to the long axis of the fuselage. The mechanism operates to translate one of the wing segments downward with respect to the other wing segment and then rotate both wing segments in opposite directions approximately 90 degrees. This places the wing segments substantially over one another, parallel to the long axis of the fuselage, and, thus, in the stowed position.

The mechanism includes an upper assembly and a lower assembly. The upper assembly includes a C-shaped outer shaft and a semi-cylindrical inner shaft. During operation between the deployed position and the stowed position, the inner shaft rotates within the outer shaft in an opposite direction to which the outer shaft rotates. The lower assembly of the mechanism also includes an outer shaft being donut-shaped and an inner shaft situated within the outer shaft. Again, during operation between the deployed position and the stowed position, the outer shaft and the inner shaft rotate in opposite directions. The outer shaft of the upper assembly is attached to the top surface of the outer shaft of the lower assembly and the inner shaft of the upper assembly is attached to the top surface of the inner shaft of the lower assembly. Thus, translation or rotation of one shaft causes simultaneous translation or rotation of the shaft fixed thereto.

The outer shaft of the lower assembly includes a rack gear which, when engaged by a pinion gear of a motor, causes the outer shafts to translate downward with respect to the inner shafts. The outer shaft of the lower assembly also includes a toothed gear which, upon complete lowering of the outer shafts, engages a gear of a motor in order to rotate the outer shaft in a clockwise direction. The inner shaft of the lower assembly also has a toothed gear which engages a motor in order to rotate the inner shafts in a counter-clockwise direction. In order to return the aircraft to the deployed position, the operation of the outer and inner shafts is reversed in order to rotate the shafts in reverse opposite directions and translate the outer shafts upward.

The above advantages, in addition to other advantages and features, will be readily apparent from the following detailed description of the invention when taken in connection with the accompanying drawings.

BRIEF DESCRIPTION OF THE DRAWINGS

For a more complete understanding of this disclosed inventive concept, reference should now be made to the embodiments illustrated in greater detail in the accompanying drawings and described below by way of examples of the disclosed inventive concept wherein.

DETAILED DESCRIPTION OF THE INVENTION

Figure 1:
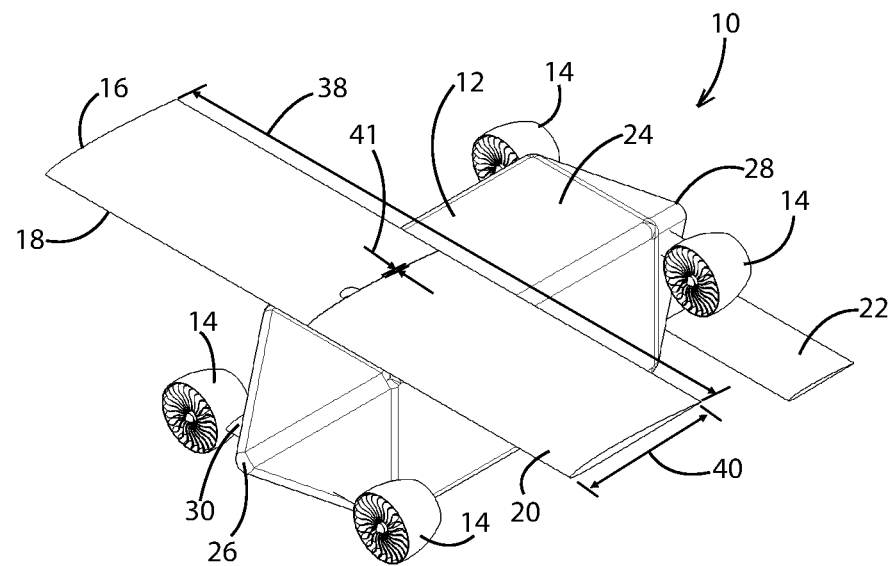
FIG. 1 is an isometric view of an aircraft having a pair of foldable wing segments in accordance with the present invention in a deployed position.

In the following figures, the same reference numerals will be used to refer to the same components. In the following description, various operating parameters and components are described for different constructed embodiments. These specific parameters and components are included as examples and are not meant to be limiting.

In accordance with the present invention and with reference to FIGS. 1-5 of the drawings, there is provided an aircraft 10 comprising a fuselage 12, a plurality of propulsion devices 14, a wing 16 including a pair of wing segments 18, 20, and an empennage 22. The fuselage 12 has a body 24, a closed front end 26, and a closed rear end 28. While it is understood that the fuselage may comprise any shape suitable for providing optimal aerodynamics, the body 24 of the fuselage 12 preferably has a rectangular or square cross-section. Furthermore, the front end 26 and the rear end 28 of the fuselage 12 are tapered. More preferably, the front end 26 and the rear end 28 are pyramidal in order to reduce air resistance and provide other benefits. More preferably, the corners of the fuselage 12 and ends 26, 28 thereof may have chamfers or fillets formed therein.

Throughout the ensuing description, it is to be appreciated that no structure is mounted directly to the fuselage 12. Instead, connecting members having an airfoil shape are used to interconnect the individual components to the fuselage 12. For example, each propulsion device 14 is coupled to the fuselage 12 via a propulsion connecting member 30 and the wing 16 is coupled to the body 24 of the fuselage 12 via a translation and rotation mechanism 32, discussed in more detail below. The empennage 22 includes a vertical stabilizer 34 and a horizontal stabilizer 36 mounted to the fuselage 12, thereby forming an inverted T-tail structure. Although not shown, the empennage 22 may also include an empennage connecting member to increase the spacing between the empennage 22 and the fuselage 12. Thus, it is to be understood that any reference to any component being "mounted" to the fuselage is to be interpreted as being coupled thereto via a respective connecting member. Furthermore, it is to be appreciated that each of roll, pitch, and yaw may be controlled by any one or a combination of the propulsion devices 14, the wing 16, the empennage 22, or, alternatively, a canard.

As shown, the empennage 22 is mounted to the rear end 28 of the fuselage 12. More particularly, the empennage 22 is mounted to a bottom surface thereof, thereby forming an inverted T-tail structure. It is to be appreciated that the empennage 22 is fixed to the fuselage 12 and the horizontal stabilizer 36 is positioned lower than the fuselage 12. Thus, it is preferred that the aircraft 10 utilizes a landing pad or dock (not shown) in order to land. As such, the aircraft 10 disclosed herein does not require landing gear. However, the empennage 22 is not a required component and embodiments failing to utilize an empennage are contemplated to fall within the scope of the present invention.

Figure 2:
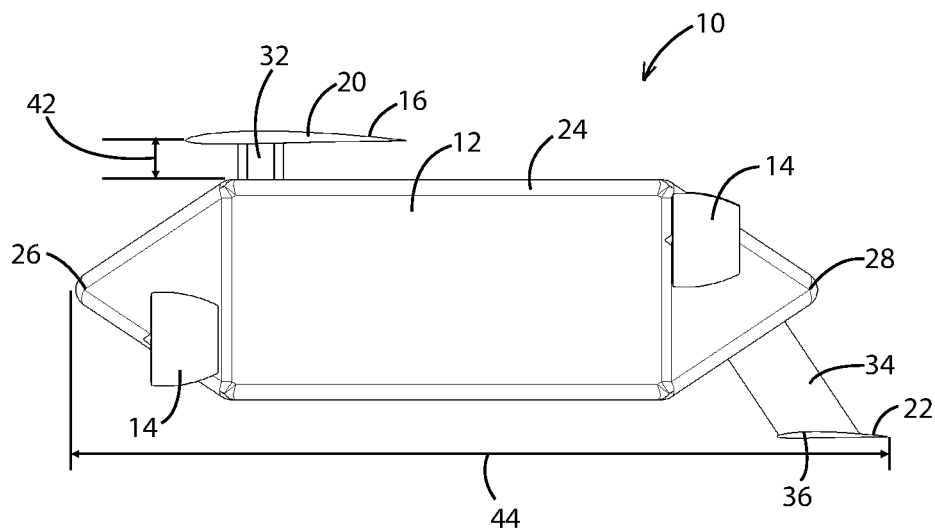
FIG. 2 is a side view of the aircraft with the wing segments in the deployed position.
Figure 3:
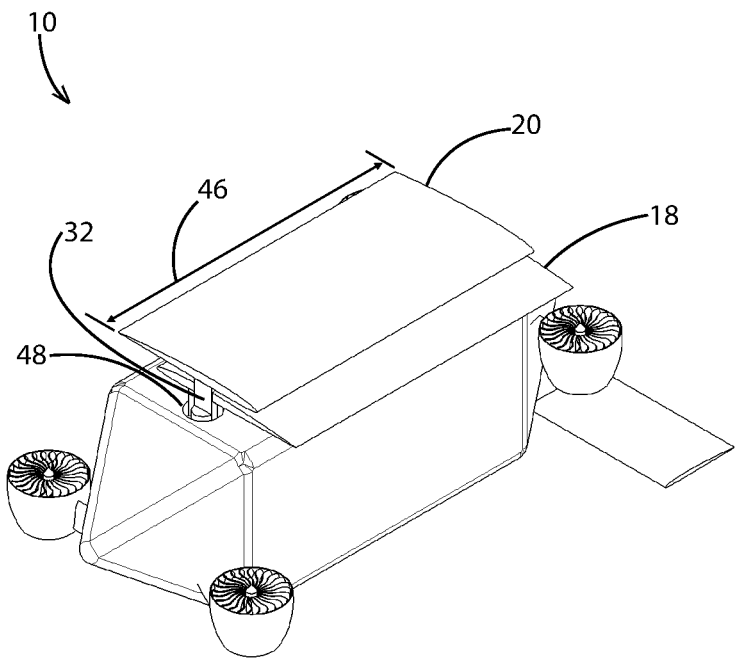
FIG. 3 is an isometric view of the aircraft in a stowed position.
Figure 4:
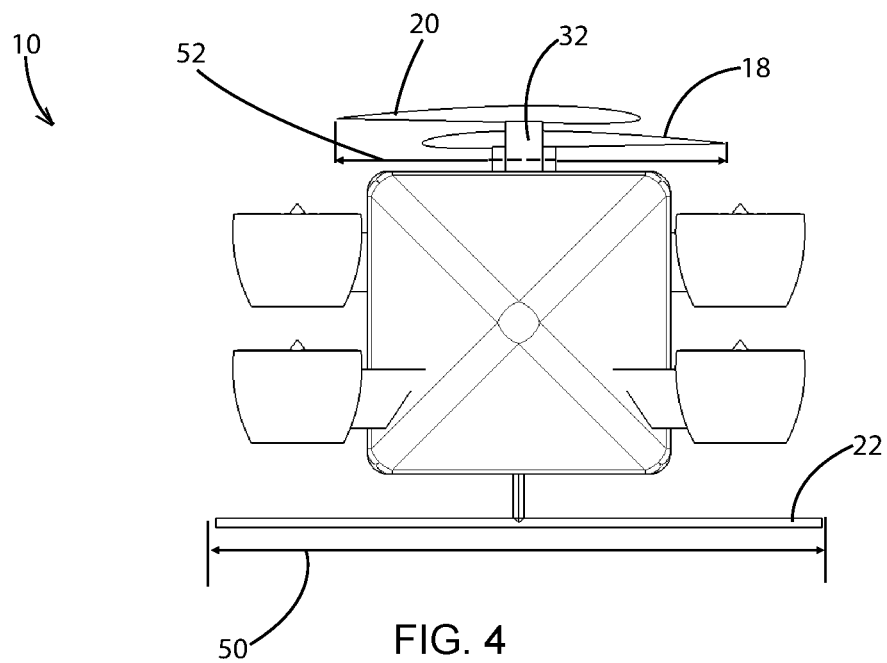
FIG. 4 is a front view of the aircraft in the stowed position.
Figure 5:
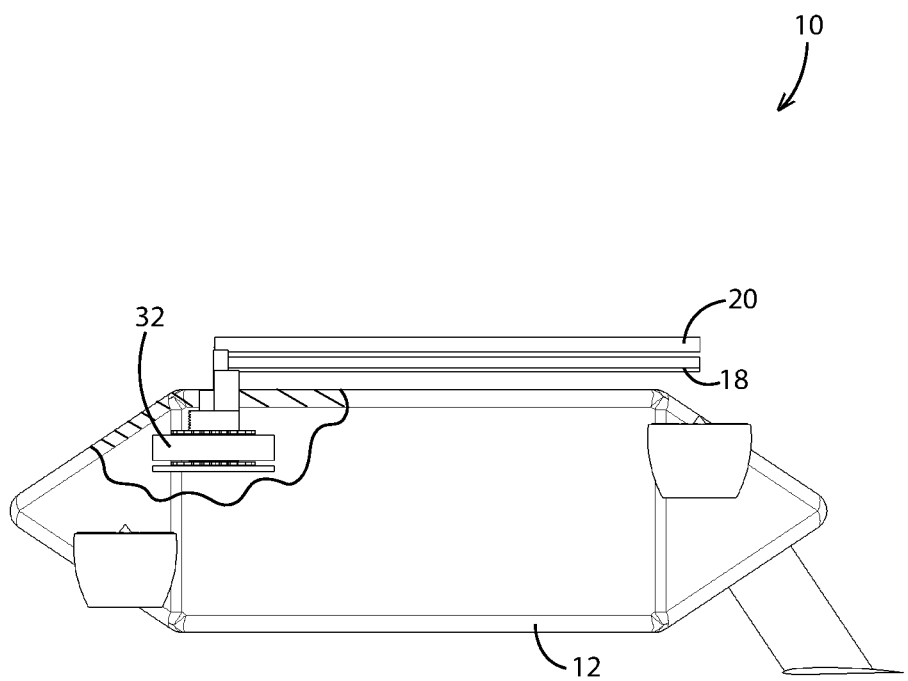
FIG. 5 is a side view showing a partial interior of the aircraft in the stowed position.

With respect to the propulsion devices 14, the propulsion devices 14 are translatable and rotatably connected to the fuselage 12 in order to rotate between a deployed position, as shown in FIGS. 1 and 2, and a stowed position, as shown in FIGS. 3-5. In the deployed position, the propulsion devices 14 create thrust in order to move the aircraft 10 in a forward direction. Alternatively, in the stowed position, the propulsion devices 14 are angled toward the ground in order to create thrust in a perpendicular direction and move the aircraft 10 vertically. As shown in FIG. 2, the propulsion devices 14 at the front end 26 of the aircraft 10 lie in a different vertical plane than the propulsion devices 14 at the rear end 28 of the aircraft 10. As a result, the rear propulsion devices 14 avoid drawing dispensed air from front propulsion devices 14 while in the deployed position. It is to be understood that the propulsion devices 14 may comprise any suitable propulsion device such as propeller engines, jet engines, electric engines, rocket engines, and the like. Similarly, any suitable means for rotating the propulsion devices 14, such as gear motors, hydraulic motor, or the like, may be disposed on the propulsion connecting member 30 or the fuselage 12 itself in order to position the propulsion devices 14 between deployed and stowed positions.

As noted above, the wing 16 comprises a first wing segment 18 and a second wing segment 20 coupled to the body 24 of the fuselage 12 via the translation and rotation mechanism 32. The wing 16 may include any form of stability or control surface such as ailerons, flaps, spoilers, etc., as well as wing-mounted propulsion devices such as electric motors, propellers, engines, jets, etc. Either during flight or in a stationary position, the wing 16 is capable of translating and rotating with respect to the fuselage 12 in order to reduce the width of the aircraft 10 by stacking the wing segments 18, 20 atop one another via the translation and rotation mechanism 32. As shown in FIGS. 1 and 2, the wing 16 is in the deployed position and lies perpendicular to the fuselage of the aircraft 10.

In the deployed position, the wing 16 has a wing span 38 and a wing chord 40. The wing segments 18, 20 are slightly separated by a span-wise separation 41 in order to allow the wing segments 18, 20 to translate without interaction. Thus, the wing span 38 is equal to the combined length of each wing segment 18, 20 and the separation 41. As shown in FIG. 2, there is a separation distance 42 between the top surface of the body 24 of the fuselage 12 and the bottom surface of the wing 16. The separation distance allows for aerodynamic laminar air flow and lift generation along the entire wing span 38 and wing chord 40 of the wing 16. Additionally, the separation distance 42 prevents any aerodynamic boundary layers from the fuselage 12 to interfere with the aforementioned laminar air flow. As a result, the continuous span 38 of the wing 16 allows for higher aspect ratio, higher lift-to-drag ratio, and lower induced drag. The aircraft 10 has an aircraft length 44.

FIGS. 3-5 illustrate the wing 16 in the stowed position with the wing segments 18, 20 translated and rotated on top of one another, via the translation and rotation mechanism 32, such that the wing segments 18, 20 lie parallel to the fuselage 12. Each wing segment 18, 20 has a wing segment span of 46. The wing segment span 46 is preferably less than the aircraft length 44. Thus, the aircraft length 44 is unchanged between the deployed position and the stowed position. As shown in FIG. 3, the wing segments 18, 20 are shown mounted to the translation and rotation mechanism 32. An opening 48 is formed in the top of the fuselage 12 for allowing the translation and rotation mechanism to extend therethrough. Preferably, the opening 48 is provided with a deformable or automatic mechanical cover (not shown) to prevent access into the fuselage 12, thereby improving aerodynamics and reducing drag.

FIG. 4 shows a front view of the aircraft 10. The empennage 22 has an empennage length 50, which is less than the wing span 38. However, the wing segments 18, 20 have a combined wing segment width 52, which is less than that of the empennage length 50. Thus, in the deployed position, the width of the aircraft 10 is defined by the wing span 38, but, in the stowed position, the width of the aircraft 10 is reduced as it is defined by the empennage length 50. This allows the aircraft 10 to reduce its width and navigate through narrow flight paths by rotating the wing segments 18, 20 into the stowed position.

Figure 6:
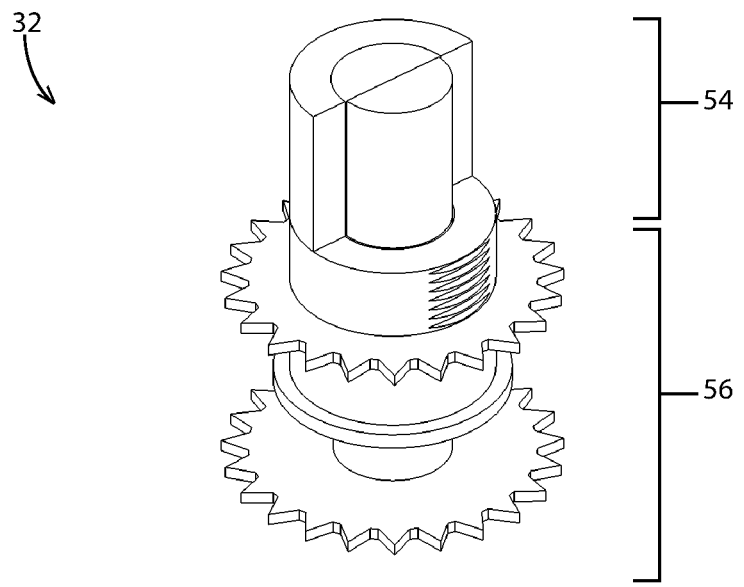
FIG. 6 is an isometric view of a translation and rotation mechanism in accordance with the present invention in the deployed position.
Figure 7:
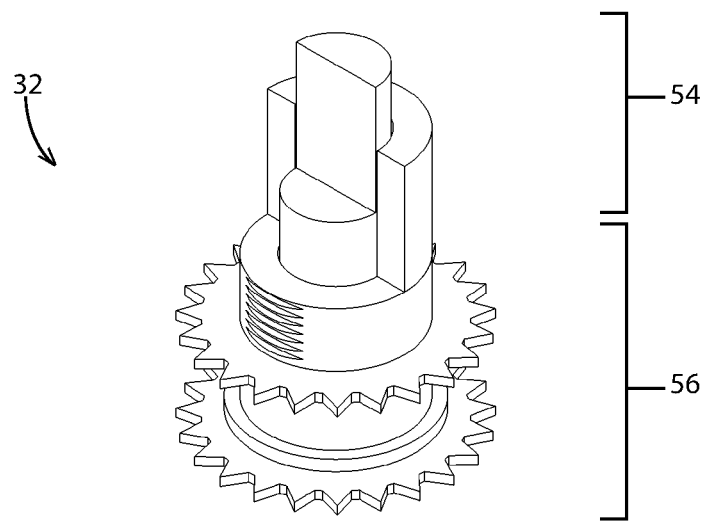
FIG. 7 is an isometric view of the translation and rotation mechanism in accordance with the present invention in the stowed position.

FIG. 5 shows a side view of the aircraft 10 and partial interior view of the fuselage 12, which illustrates the translation and rotation mechanism 32 positioned therein. With more particularity, the translation and rotation mechanism 32 is shown in FIG. 6, in the deployed position, and FIG. 7, in the stowed position. The mechanism 32 comprises an upper assembly 54 and a lower assembly 56.

Figure 8:
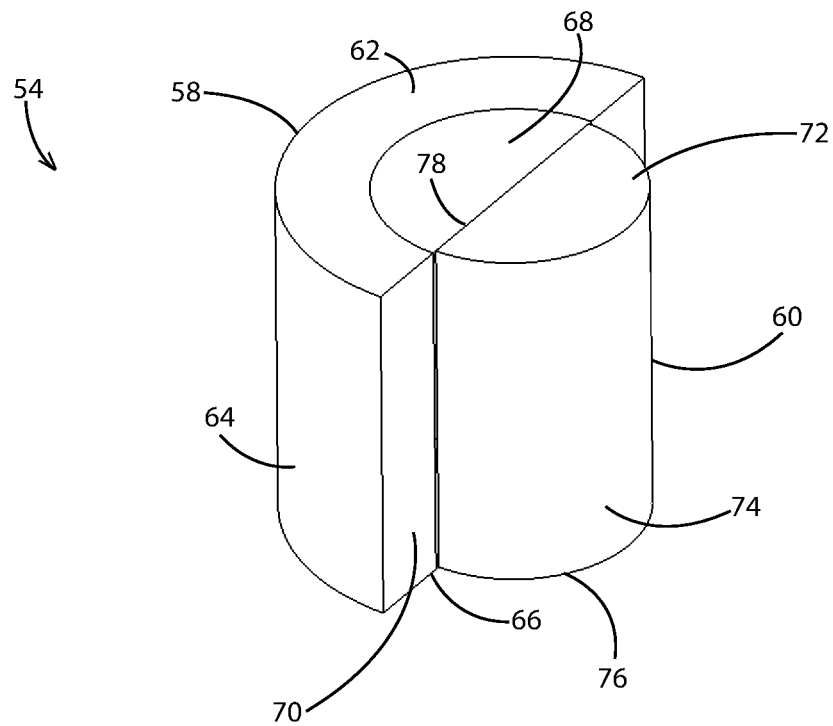
FIG. 8 is an isometric view of an upper assembly of the translation and rotation mechanism in the deployed position.
Figure 9:
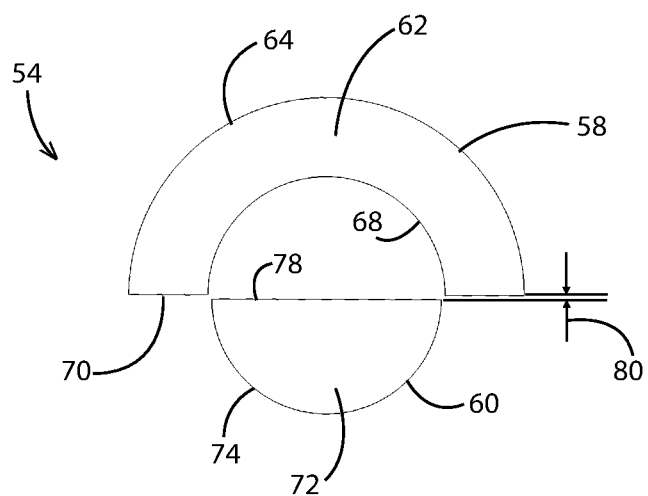
FIG. 9 is a top view of the upper assembly in the deployed position.

As shown in FIG. 8, the upper assembly 54 includes an outer shaft 58 and an inner shaft 60. The outer shaft 58 is a C-shaped member having a top surface 62, an exterior surface 64, a bottom surface 66, an interior surface 68, and a cross-section surface 70. Similarly, the inner shaft 60 is a semi-cylindrical member having a top surface 72, an exterior surface 74, a bottom surface 76, and an interior surface 78. As shown in FIG. 9, there is a slight separation 80 between the cross-section surface 70 of the outer shaft 58 and the interior surface 78 of the inner shaft 60. This separation 80 defines the separation 41 between the wing segments 18, 20 when in the deployed position. As noted above, this permits the wing segments 18, 20 to translate with respect to one another from the deployed position to the stowed position, and back, without interference.

Figure 10:
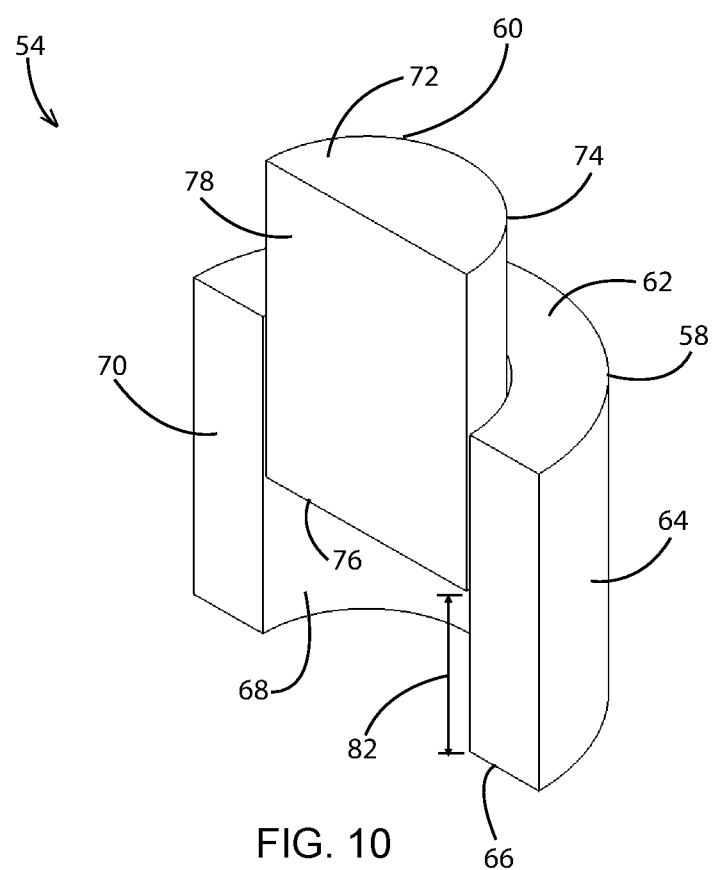
FIG. 10 is an isometric view of the upper assembly in the stowed position.
Figure 11:
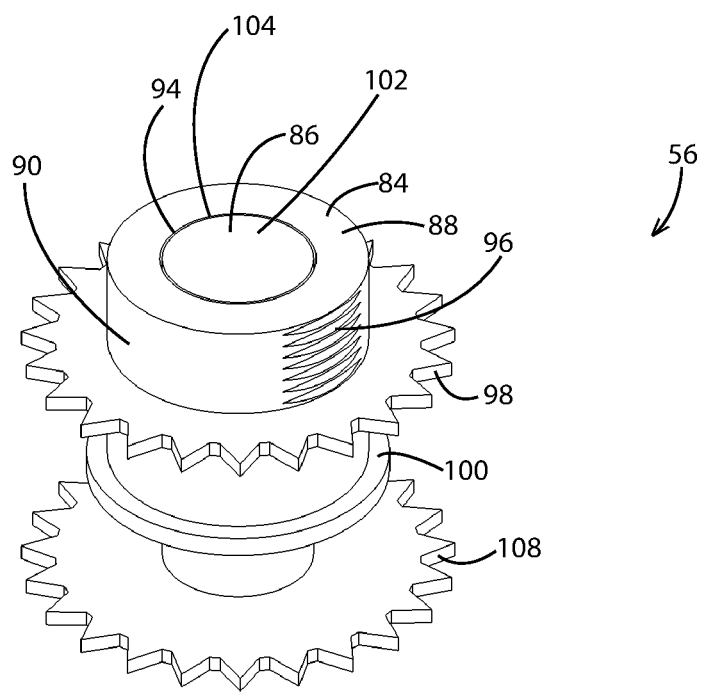
FIG. 11 is an isometric view of a lower assembly of the translation and rotation mechanism in the deployed position.
Figure 12:
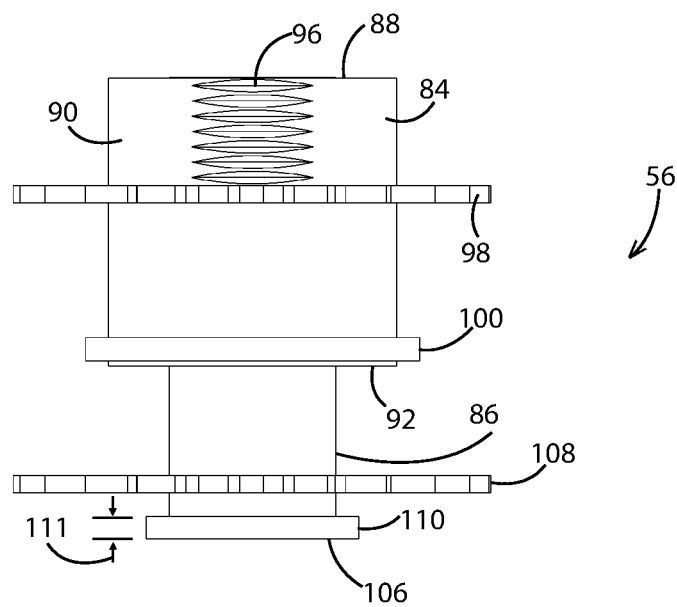
FIG. 12 is a side view of the lower assembly in the deployed position.
Figure 13:
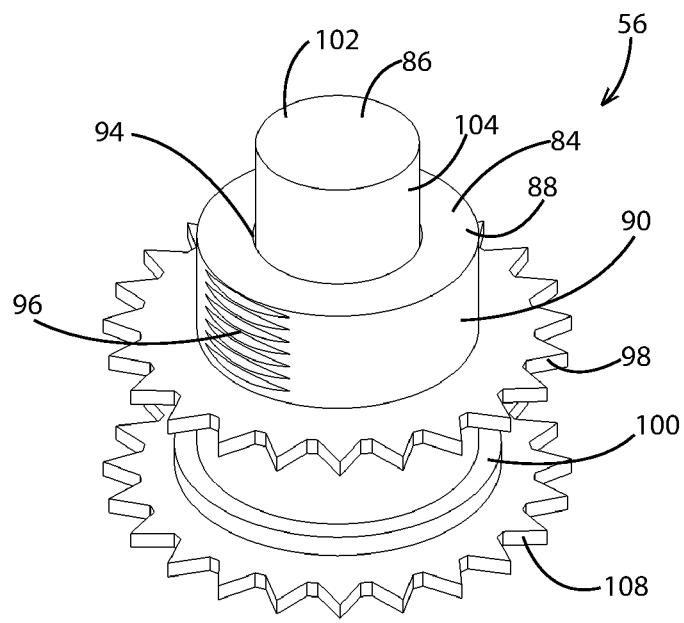
FIG. 13 is an isometric view of the lower assembly in the stowed position.
Figure 14:
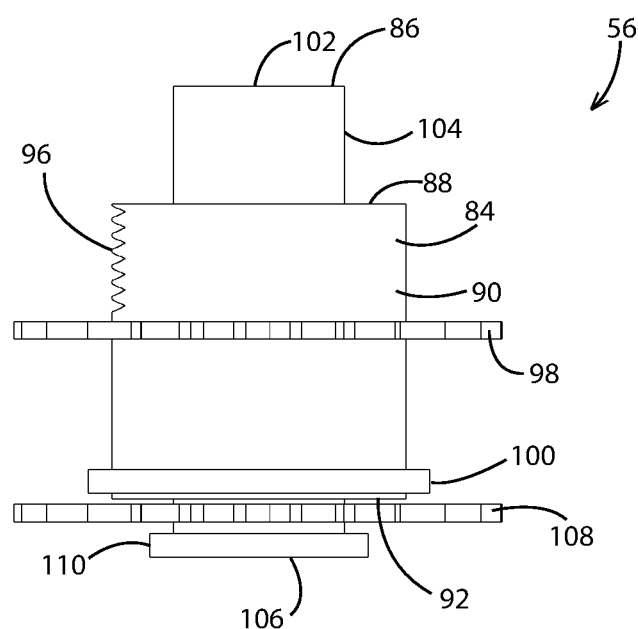
FIG. 14 is a side view of the lower assembly in the stowed position.

During operation of the mechanism 32 between the deployed position and the stowed position, the outer shaft 58 initially translates axially downward by a distance 82, shown in FIG. 10. The outer shaft 58 then rotates in a clockwise direction approximately 90 degrees. As the outer shaft 58 rotates, the inner shaft 60 simultaneously rotates in a counter-clockwise direction approximately 90 degrees. As discussed in more detail below, the first wing segment 18 is attached to the outer shaft 58 and the second wing segment 20 is attached to the inner shaft 60. Thus, the rotation of the outer shaft 58 and the inner shaft 60 in the opposite direction rotate the wing segments 18, 20 on top of one another and parallel to the fuselage 12.

With respect to the lower assembly 56, the lower assembly 56 also includes an outer shaft 84 and an inner shaft 86. The outer shaft 84 is a donut-shaped member having a top surface 88, an exterior surface 90, a bottom surface 92, and an interior surface 94. The exterior surface 90 of the outer shaft 84 has a rack gear 96 having a plurality of teeth cut or recessed into the exterior surface 90. Alternatively, the teeth of the rack gear 96 may protrude out of the exterior surface 90. The length of the rack gear 96 is approximately equal to the distance 82 of displacement of the outer shaft 58 of the upper assembly 54. The outer shaft 84 also includes a toothed gear 98 and a bearing 100 rigidly attached to the exterior surface 90 thereof. The toothed gear 98 is illustrated as a spur gear, but it is understood that toothed gear 98 may alternatively be a helical gear or a bevel gear.

The inner shaft 86 is a cylindrical member having a top surface 102, an exterior surface 104, and a bottom surface 106. The inner shaft also includes a toothed gear 108 and a bearing 110 rigidly attached to the exterior surface 104 and proximate the bottom surface 106 thereof. The toothed gear 108 is similar to the toothed gear 98 attached to the outer shaft 84.

In transitioning the lower assembly 56 from the deployed position to the stowed position, axial force is initially applied to the outer shaft 84 via a motor (not shown), such as a gear motor, a hydraulic motor, an electric motor, an actuator, an engine, a servo, or the like, which operates a pinion gear (not shown) that engages the rack gear 96 and the outer shaft 84 translates downward axially with respect to the inner shaft 86. In the initial deployed position, the toothed gear 98 on the outer shaft 84 is initially disengaged. Once the outer shaft 84 reaches its lowered position, the toothed gear 98 engages the motor. The motor then applies torque to the toothed gear 98, which rotates the outer shaft 84 in a clockwise direction into the stowed position.

It is to be appreciated that, because the inner shaft 86 does not move axially, the toothed gear 108 fixed to the inner shaft 86 is in constant engagement with the motor. Thus, upon activation of the motor, the inner shaft 86 is rotated in a counter-clockwise direction into the stowed position. In order to return the lower assembly 56 to its deployed position, the above steps are performed in the reverse order.

Figure 15:
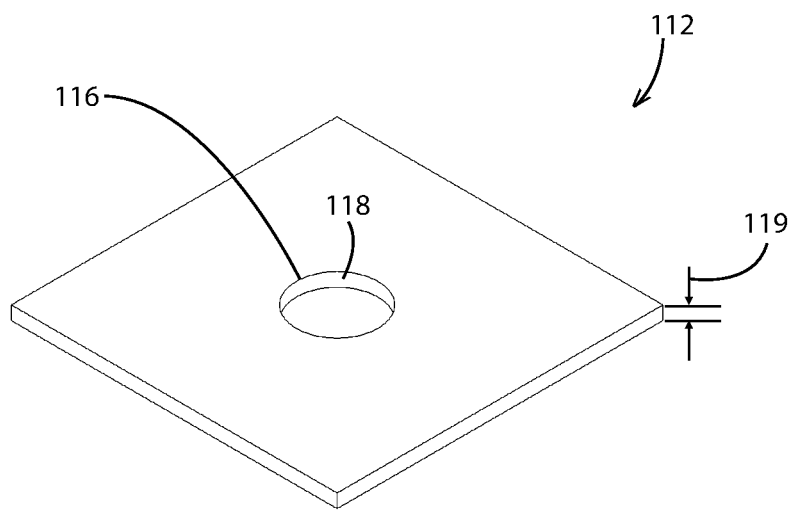
FIG. 15 is an isometric view of a lower plate.
Figure 16:
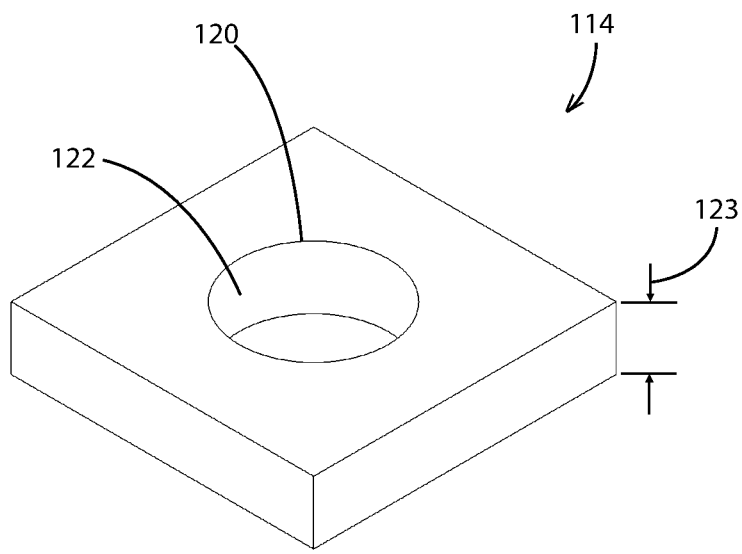
FIG. 16 is an isometric view of an upper plate.

The translation and rotation mechanism 32 further comprises a lower plate 112 and an upper plate 114 illustrated in FIGS. 15 and 16, respectively. The plates 112, 114 provide axial and/or translational guide and load bearing structural support to the bearings 110, 100 and the shafts 86, 84, respectively. Both plates 112, 114 are rigidly fixed to load bearing structures on the fuselage 12. The lower plate 112 has a central, circular opening 116 with an inner circumferential surface 118. The circumferential surface 118 is slightly larger than the outer race of the bearing 110 on the inner shaft 86. The thickness 119 of the lower plate 112 is approximately equal to the thickness 111 of the bearing 110 on the inner shaft 86 of the lower assembly 56. The upper plate 114 has a central, circular opening 120 with an inner circumferential surface 122. The circumferential surface 122 is slightly larger than the outer race of the bearing 100 on the outer shaft 84. The thickness 123 of the upper plate 114 is approximately equal to the distance 82, which is equal to the distance travelled by the bearing 100 on the outer shaft 84 of the lower assembly 56 during transition from the deployed position to the stowed position.

Figure 17:
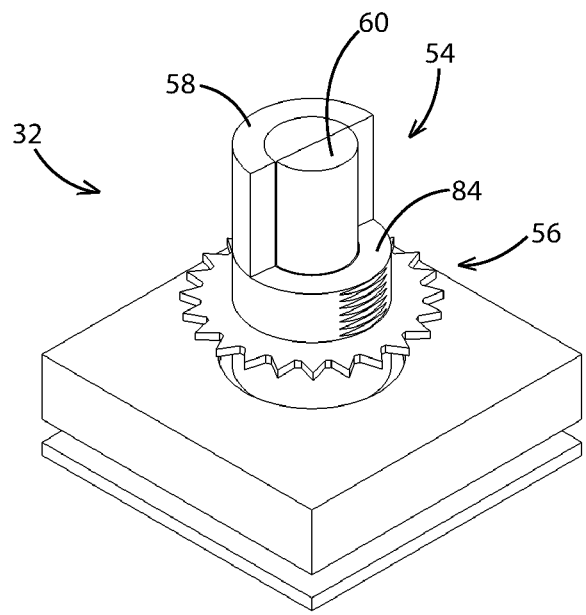
FIG. 17 is an isometric view of the lower plate and the upper plate in position on the translation and rotation mechanism in the deployed position.
Figure 18:
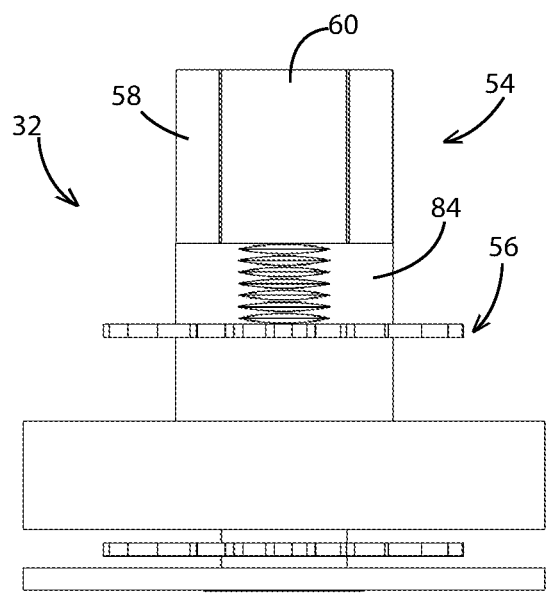
FIG. 18 is a side view of the lower plate and the upper plate in position on the translation and rotation mechanism in the deployed position.

FIGS. 17 and 18 illustrate the assembled translation and rotation mechanism 32 in the deployed position with the lower assembly 56 partially housed within the upper and lower plates 112, 114, and the upper assembly 54 positioned on top of the lower assembly 56. More particularly, the bottom surface 66 of the outer shaft 58 of the upper assembly 54 is fixed to the top surface 88 of the outer shaft 84 of the lower assembly 56. Similarly, the bottom surface 76 of the inner shaft 60 of the upper assembly 54 is fixed to the top surface 102 of the inner shaft 86 of the lower assembly 56.

Figure 19:
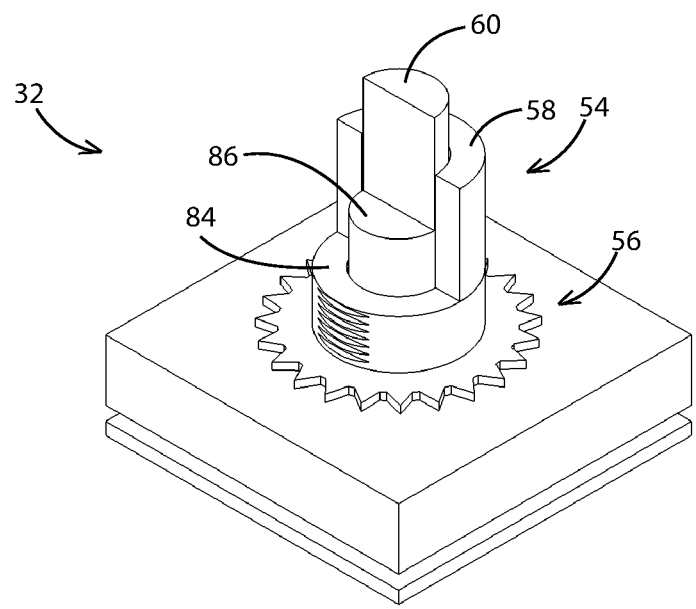
FIG. 19 is an isometric view of the lower plate and the upper plate in position on the translation and rotation mechanism in the stowed position.
Figure 20:
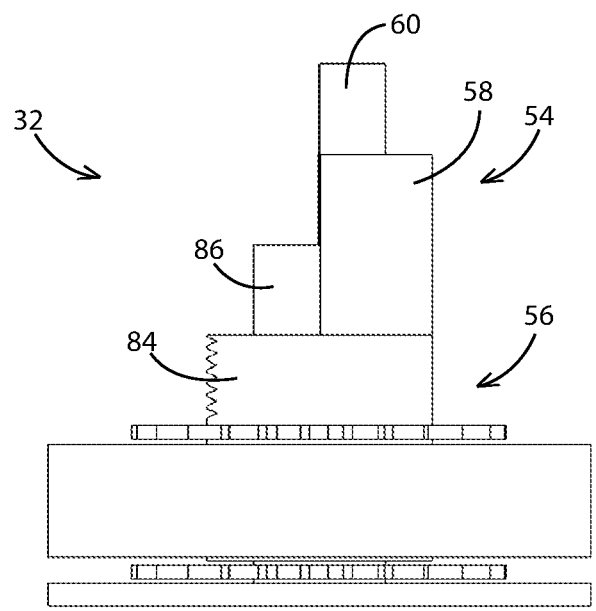
FIG. 20 is a side view of the lower plate and the upper plate in position on the translation and rotation mechanism in the stowed position.

FIGS. 19 and 20 illustrate the fully assembled mechanism 32 in the stowed position. Thus, it is to be understood that, in transitioning from the deployed position to the stowed position, the outer shafts 58, 84 translate in an axial downward direction. Subsequently the outer shafts 58, 84 rotate simultaneously in a clockwise direction as the inner shafts 60, 86 rotate simultaneously in a counter-clockwise direction. It is to be understood that, despite the outer shafts 58, 84 being taught as translating downward in order to position the wing segment 18 below the wing segment 20, the present invention is not limited to this arrangement. Alternatively, the outer shafts 58, 84 may translate upwardly or the inner shafts 60, 86 may translate axially and the outer shafts 58, 84 may be axially fixed.

Figure 21:
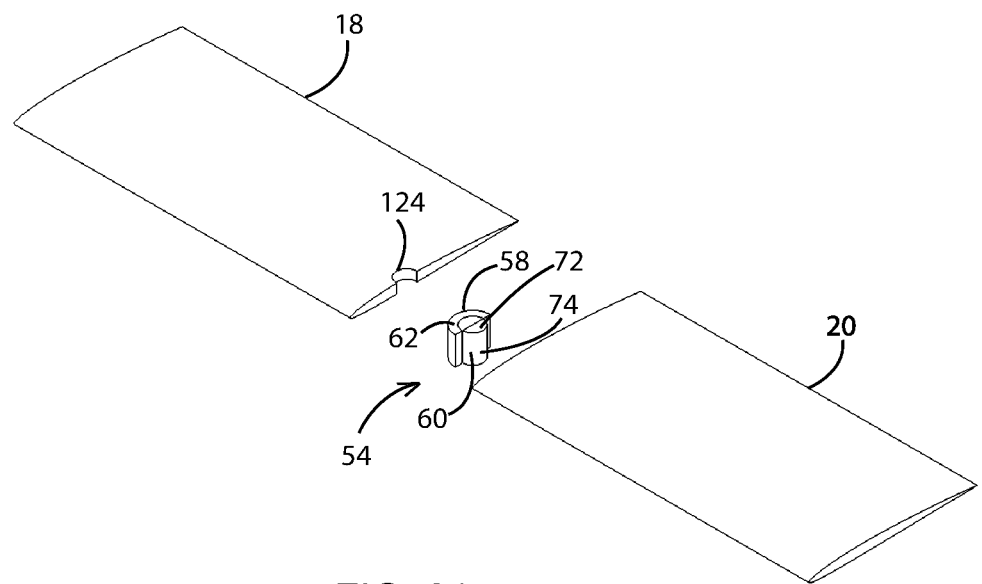
FIG. 21 is an exploded isometric view of the wing segments including a single cut out portion and the upper assembly of the translation and rotation mechanism in the deployed position.
Figure 22:
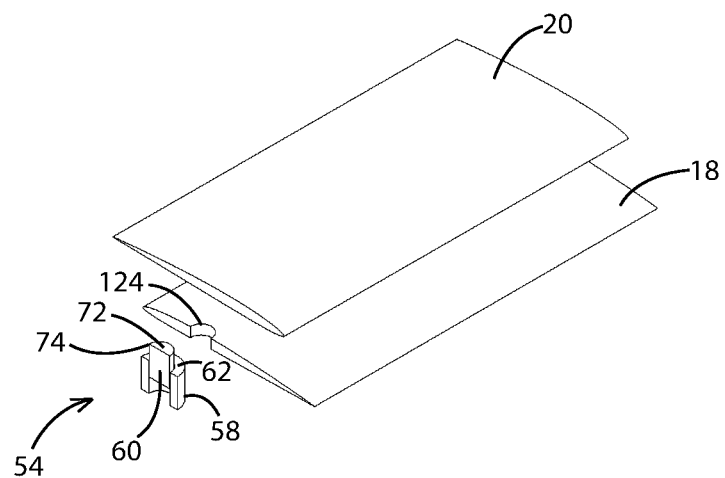
FIG. 22 is an exploded isometric view of the wing segments and the upper assembly in the stowed position.

FIGS. 21 and 22 show an exploded view of the wing segments 18, 20 in the deployed position and the stowed position, respectively. The wing segments 18, 20 are positioned and secured to the outer shaft 58 and the inner shaft 60 of the upper assembly 54, respectively. More particularly, the bottom surface of the first wing segment 18 is rigidly attached to the top surface 62 of the outer shaft 58 of the upper assembly 54. The second wing segment 20 is rigidly attached to the top surface 72 of the inner shaft 60 of the upper assembly 54. The first wing segment 18 has a semi-circular cutout 124 having a radius slightly larger than the radius of the exterior surface 74 of the inner shaft 60 of the upper assembly 54. This permits the first wing segment 18 to rotate around the exterior surface 74 during transition between the deployed position and the stowed position without interference.

Figure 23:
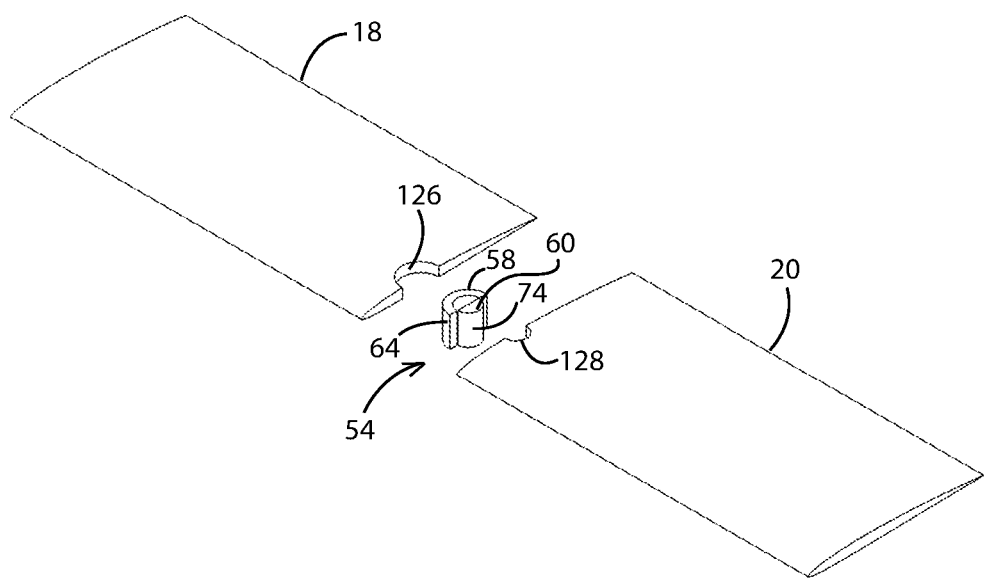
FIG. 23 is an exploded isometric view of the wing segments including a pair of cut out portions and the upper assembly of the translation and rotation mechanism in the deployed position.
Figure 24:
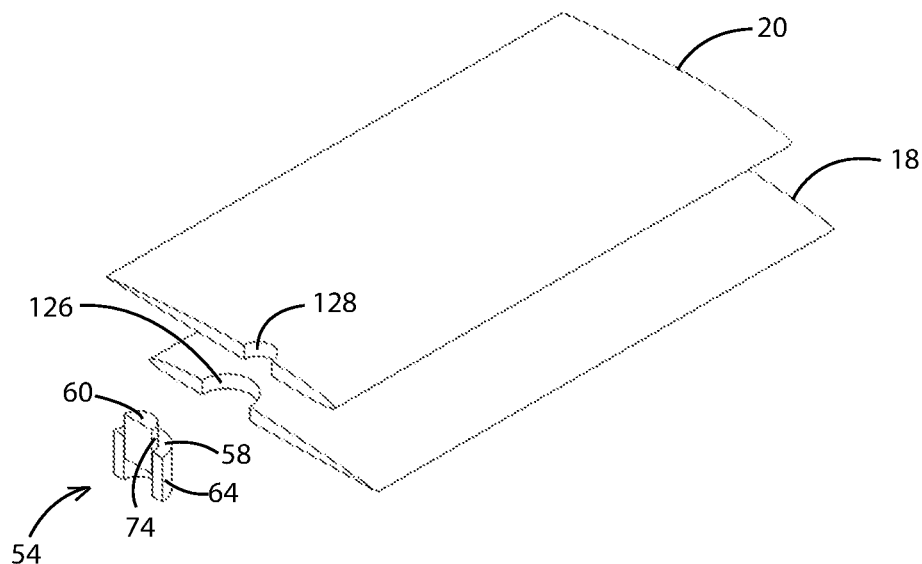
FIG. 24 is an exploded isometric view of the wing segments of FIG. 23 and the upper assembly in the stowed position.

As shown in FIGS. 23 and 24, the wing segments 18, 20 and upper assembly 54 are illustrated in an exploded view. Instead of the wing segments 18, 20 being attached to the top surfaces 62, 72 of the outer and inner shafts 58, 60, respectively, each wing segment 18, 20 may include a cutout for attachment to the shafts 58, 60. For example, the first wing segment 18 includes a cutout 126 that is rigidly secured to the exterior surface 64 of the outer shaft 58 of the upper assembly 54. Additionally, the second wing segment 20 includes a cutout 128 that is rigidly secured to the exterior surface 74 of the inner shaft 60 of the upper assembly 54. Any or all wing entities such as spars, ribs, braces, skins, etc. can be used to attach the wing segments 18, 20 to the outer and inner shafts 58, 60.

It is to be appreciated that the present invention is not limited to the specific arrangement illustrated herein. As such, it is to be appreciated that locations of various components of the aircraft 10 may be modified without deviating from the scope of the present invention. For example, the wing 16 may be secured to the bottom of the body 24 of the fuselage 12 instead of the top. When this is the case, the empennage 22 is moved to the top of the rear end 28 of the fuselage 12 in order to not obstruct rotation of the wing 16. Additionally, the wing 16 may be moved forward or rearward along the body 24 of the fuselage 12. When the wing 16 is moved rearward, the aircraft 10 will include a canard (not shown) instead of the empennage 22 in order to maintain the aerodynamics of the aircraft 10.

From the above, it is to be appreciated that defined herein is a new and unique aircraft having flight stabilizing components, such as a translatable and rotatable wing, whether unitary or segmented, an empennage, and/or a canard, each mounted in a spaced apart relation with respect to the fuselage.

One skilled in the art will readily recognize from such discussion, and from the accompanying drawings and claims, that various changes, modifications, and other variations can be made therein without departing from the spirit and fair scope of the disclosed inventive concept as defined by the following claims.

What is claimed is:

1. An aircraft operable between a deployed position and a stowed position comprising:
    a fuselage;
    a pair of wing segments; and
    a translation and rotation mechanism comprising:
        an upper assembly including an outer shaft and an inner shaft, said outer shaft of said upper assembly and said inner shaft of said upper assembly being rotatable in opposite directions and at least one of said outer shaft of said upper assembly and said inner shaft of said upper assembly being translatable; and a lower assembly including an inner shaft and an outer shaft rotatable in opposite directions, said outer shaft of said upper assembly attached to an upper surface of said outer shaft of said lower assembly, said inner shaft of said upper assembly attached to an upper surface of said inner shaft of said lower assembly, wherein a first wing segment of said pair of wing segments is attached to said outer shaft of said upper assembly and a second wing segment of said pair of wing segments is attached to said inner shaft of said upper assembly.

2. The aircraft of claim 1, wherein said outer shaft of said lower assembly includes a rack gear.

3. The aircraft of claim 2, wherein said outer shaft of said lower assembly includes a toothed gear, said outer shaft of said lower assembly including a bearing.

4. The aircraft of claim 1, wherein said inner shaft of said lower assembly includes a toothed gear and a bearing.

5. The aircraft of claim 1, wherein said first wing segment of said pair of wing segments is attached to a top surface of said outer shaft of said upper assembly and wherein said second wing segment of said pair of wing segments is attached to a top surface of said inner shaft of said upper assembly.

6. The aircraft of claim 5, wherein said first wing segment of said pair of wing segments includes a cutout for permitting rotation of said inner shaft of said upper assembly without interference as said pair of wing segments rotates.

7. The aircraft of claim 1, wherein said first wing segment of said pair of wing segments is attached to an exterior surface of said outer shaft of said upper assembly and wherein said second wing segment of said pair of wing segments is attached to an exterior surface of said inner shaft of said upper assembly.

8. The aircraft of claim 7, wherein said first wing segment of said pair of wing segments includes a cutout for attaching to said outer shaft of said upper assembly, and wherein said second wing segment of said pair of wing segments includes a cutout for attaching to said inner shaft of said upper assembly.

9. An aircraft operable between a deployed position and a stowed position, the aircraft comprising:
a fuselage having a long axis;
a pair of wing segments; and
a translation and rotation mechanism comprising:
an upper assembly including an outer shaft and an inner shaft, said outer shaft of said upper assembly and said inner shaft of said upper assembly being rotatable in opposite directions and at least one of said outer shaft of said upper assembly and said inner shaft of said upper assembly being translatable; and
a lower assembly including an inner shaft and an outer shaft rotatable in opposite directions, said outer shaft of said upper assembly attached to an upper surface of said outer shaft of said lower assembly, said inner shaft of said upper assembly attached to an upper surface of said inner shaft of said lower assembly,
wherein a first wing segment of said pair of wing segments is attached to said outer shaft of the upper assembly and a second wing segment of said pair of wing segments is attached to said inner shaft of said upper assembly, wherein said pair of wing segments extends perpendicular to said long axis of said fuselage when in the deployed position and parallel to said long axis of said fuselage when in the stowed position.

10. The aircraft of claim 9, wherein said first wing segment of said pair of wing segments is attached to a top surface of said outer shaft of said upper assembly and wherein said second wing segment of said pair of wing segments is attached to a top surface of said inner shaft of said upper assembly.

11. The aircraft of claim 10, wherein said first wing segment of said pair of wing segments includes a cutout for permitting rotation of said inner shaft of said upper assembly without interference as said pair of wing segments rotates.

12. The aircraft of claim 9, wherein said first wing segment of said pair of wing segments is attached to an exterior surface of said outer shaft of said upper assembly and wherein said second wing segment of said pair of wing segments is attached to an exterior surface of said inner shaft of said upper assembly.

13. The aircraft of claim 12, wherein said first wing segment of said pair of wing segments includes a cutout for attaching to said outer shaft of said upper assembly, and wherein said second wing segment of said pair of wing segments includes a cutout for attaching to said inner shaft of said upper assembly.

14. The aircraft of claim 9, wherein said outer shaft of said lower assembly includes a rack gear.

15. The aircraft of claim 14, wherein said outer shaft of said lower assembly includes a toothed gear positioned below said rack gear, said outer shaft of said lower assembly including a bearing.

16. The aircraft of claim 9, wherein said inner shaft of said lower assembly includes a toothed gear and a bearing.

17. A method of transitioning an aircraft between a deployed position and a stowed position, the method comprising the steps of:
providing an aircraft having a fuselage, a pair of wing segments, and a translation and rotation mechanism for coupling said pair of wing segments to said fuselage and moving said pair of wing segments between the deployed position and the stowed position, said mechanism comprising:
an upper assembly including an outer shaft and an inner shaft; and
a lower assembly including an inner shaft and an outer shaft rotatable in opposite directions, said outer shaft of said upper assembly attached to an upper surface of said outer shaft of said lower assembly, said inner shaft of said upper assembly attached to an upper surface of said inner shaft of said lower assembly;
translating at least one of said outer shaft of said upper assembly and said inner shaft of said upper assembly, thereby translating a first wing segment of said pair of wing segments downward with respect to a second wing segment of said pair of wing segments; and
rotating said outer shaft of said upper assembly and said inner shaft of said upper assembly in opposite directions, thereby rotating said first wing segment and said second wing segment of said pair of wing segments in opposite directions.

18. The method of claim 17, wherein said fuselage has a long axis and said pair of wing segments extends perpendicular to said long axis of said fuselage when in the deployed position, the method further comprising the steps of rotating said pair of wing segments parallel to said long axis of said fuselage when in said stowed position.

* * * * *